(12) United States Patent
Oscarsson

(10) Patent No.: US 10,234,586 B2
(45) Date of Patent: Mar. 19, 2019

(54) SYSTEM AND METHOD OF A BUOYANT TAIL SECTION OF A GEOPHYSICAL STREAMER

(71) Applicant: PGS Geophysical AS, Oslo (NO)

(72) Inventor: Mattias Dan Christian Oscarsson, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/424,291

(22) Filed: Feb. 3, 2017

(65) Prior Publication Data

US 2017/0146676 A1    May 25, 2017

Related U.S. Application Data

(63) Continuation of application No. 14/478,042, filed on Sep. 5, 2014, now Pat. No. 9,599,735.

(60) Provisional application No. 62/013,247, filed on Jun. 17, 2014.

(51) Int. Cl.
*G01V 1/38*    (2006.01)
*G01V 1/20*    (2006.01)

(52) U.S. Cl.
CPC ............ *G01V 1/3826* (2013.01); *G01V 1/201* (2013.01); *G01V 1/3808* (2013.01); *G01V 1/3817* (2013.01); *G01V 2001/207* (2013.01)

(58) Field of Classification Search
CPC .... G01V 1/3826; G01V 1/3808; G01V 1/201; G01V 1/3817; G01V 2001/207

USPC .......................................................... 367/18
See application file for complete search history.

(56) References Cited

U.S. PATENT DOCUMENTS

| | | | |
|---|---|---|---|
| 3,269,047 A | 8/1966 | Slattery | |
| 3,583,169 A | 6/1971 | Morgan | |
| 4,745,583 A | 5/1988 | Motal | |
| 4,853,900 A * | 8/1989 | Snyderwine | B63B 22/003 367/3 |
| 5,400,298 A * | 3/1995 | Hepp | G01V 1/201 174/101.5 |
| 7,377,224 B2 | 5/2008 | Ryan | |
| 7,379,386 B2 | 5/2008 | Muyzert | |
| 7,998,031 B2 | 8/2011 | Dumke | |
| 2013/0317779 A1 | 11/2013 | Thorne | |

* cited by examiner

*Primary Examiner* — Daniel L Murphy

(57) ABSTRACT

Buoyant tail section of a geophysical streamer. At least some of the example embodiments are methods of performing a geophysical survey in a marine environment, the method including: towing an active section of a geophysical streamer in the marine environment, the active section having a buoyancy; towing a tail section, the tail section coupled to a distal end of the active section, the towing of the tail section by way of the active section, and at least a portion of the tail section having a buoyancy that is both positively buoyant and greater than buoyancy of the active section; towing a tail buoy in the marine environment, the tail buoy coupled to a distal end of the tail section, and the towing of the tail buoy by way of the tail section; and gathering geophysical survey data by way of the active section.

14 Claims, 9 Drawing Sheets

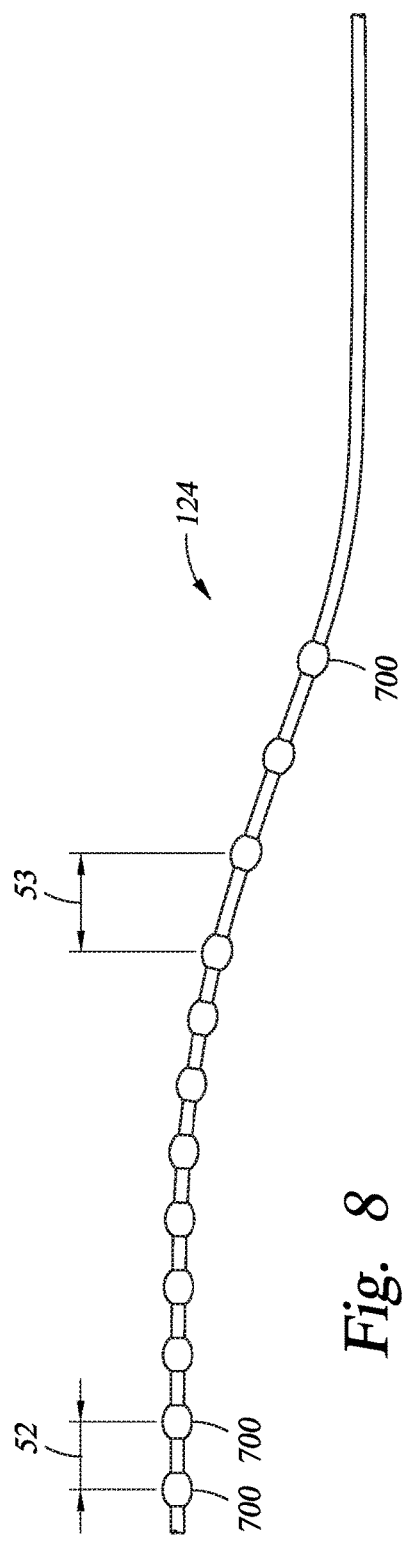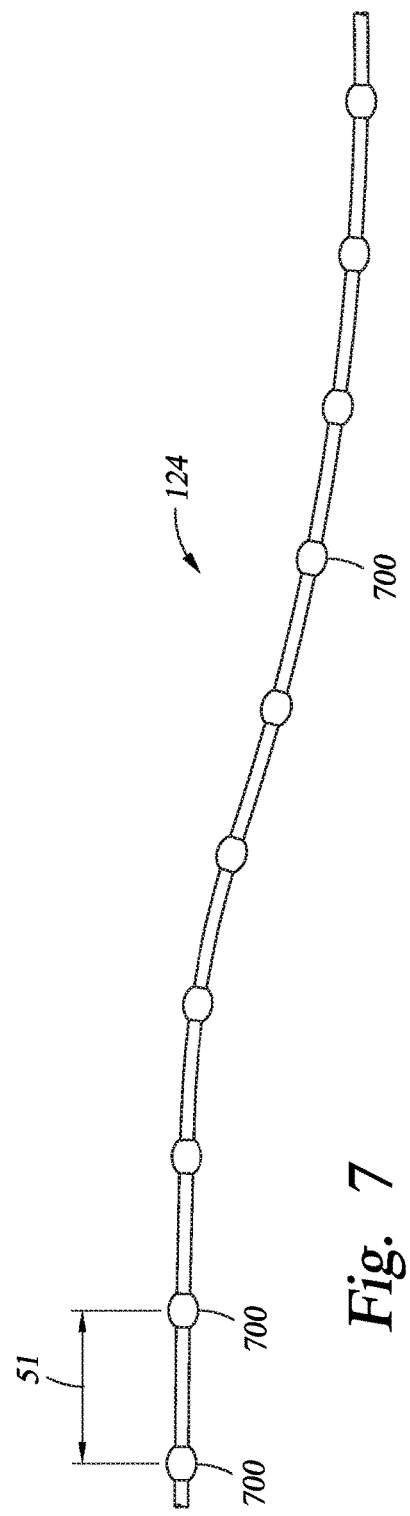
Fig. 8
Fig. 7

SYSTEM AND METHOD OF A BUOYANT TAIL SECTION OF A GEOPHYSICAL STREAMER

CROSS-REFERENCE TO RELATED APPLICATIONS

This application is a continuation of U.S. application Ser. No. 14/478,042 filed Sep. 5, 2014 and titled "System and Method of a Buoyant Tail Section of a Geophysical Streamer," and this application claims the benefit of U.S. Provisional Application Ser. No. 62/013,247 filed Jun. 17, 2014 and titled "Reduced Tail Tugging by Buoyant Tail Sections". Both applications are incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of geophysical streamers, which contain one or more sensors to detect energy emitted by one or more sources and subjected to interaction with underground formations below the water bottom. For example, seismic streamers may include sensors for detecting seismic signals reflected from the subterranean formations including hydrocarbon deposits.

Geophysical streamers may be subject to streamer-induced noise associated with towing of the streamers through the water, as well as noise associated with the equipment that controls placement of the streamers. The noise may mask desired signals, and thus any technique which reduces noise may provide a competitive advantage in the marketplace.

BRIEF DESCRIPTION OF THE DRAWINGS

For a detailed description of exemplary embodiments, reference will now be made to the accompanying drawings in which:

FIG. 7 shows a side elevation view of a tail section in accordance with at least some embodiments;

FIG. 8 shows a side elevation view of a tail section in accordance with at least some embodiments;

NOTATION AND NOMENCLATURE

Figure 1:
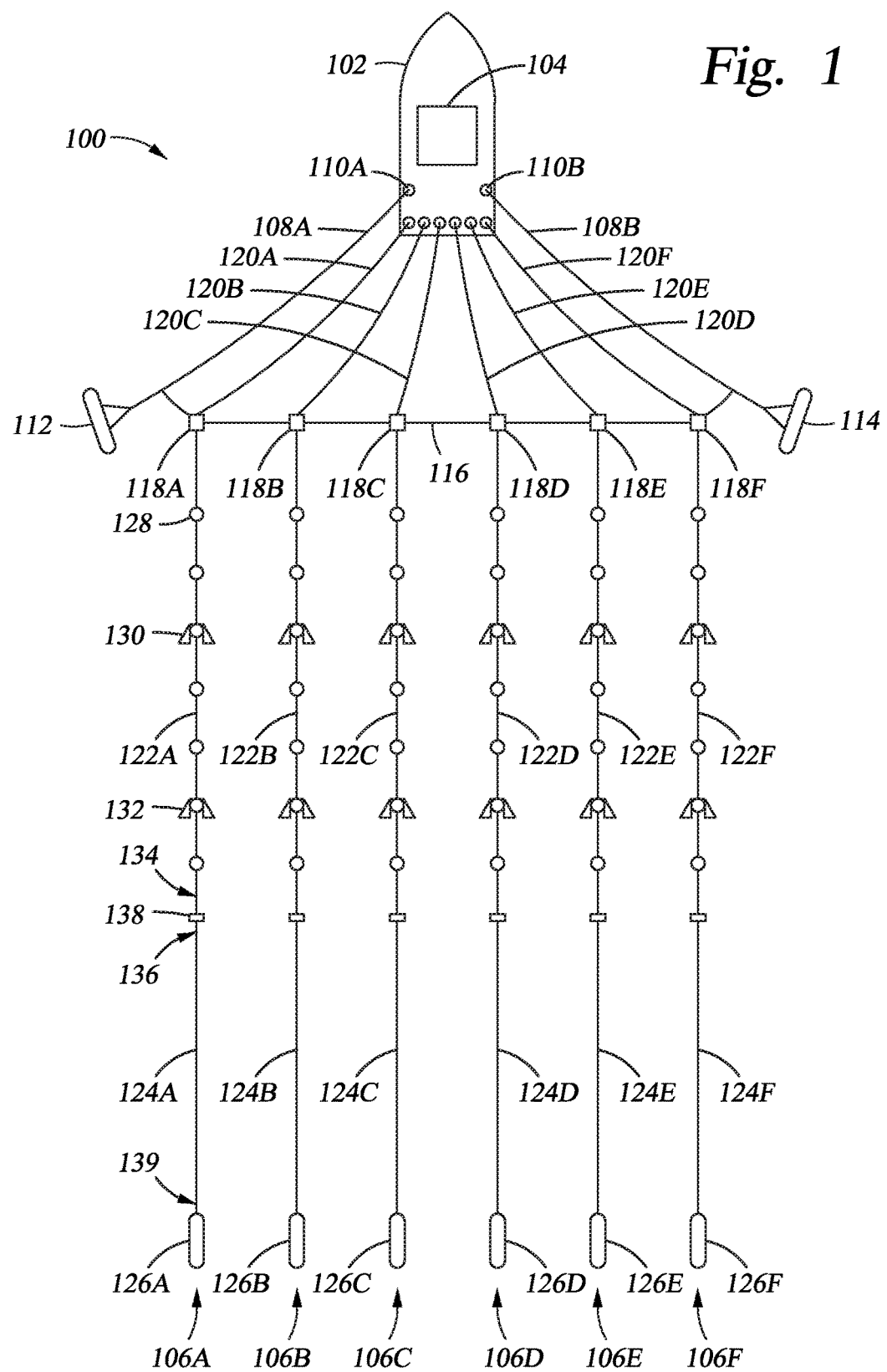
FIG. 1 shows an overhead view of a geophysical survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Proximal" and "distal" shall be in reference to tow direction of a geophysical streamer and measured along the geophysical streamer. Thus a proximal end of geophysical streamer is closer to a tow vessel than a distal end of the geophysical streamer. Likewise, a proximal portion of a geophysical streamer is closer to the tow vessel than a distal portion.

Buoyancy of a geophysical streamer (or any section thereof) shall reference the mass of the geophysical streamer per unit length in relation to the mass of water displaced by the geophysical streamer over the unit length. Operation of depth control devices that function based on deflection of control surfaces as the devices move through the water shall not be read to affect buoyancy of the geophysical streamer.

If considered over small unit lengths (e.g., a centimeter in axial length), portions of a segment of a tail section might be negatively buoyant (e.g., at the metallic coupler portions); however, buoyancy of the overall segment will be at least neutrally buoyant, and thus analyzing buoyancy over small unit lengths shall not obviate the buoyancy status of a segment (or an entire tail section).

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to reducing tugging force applied to each active section of a streamer in high seas, the tugging caused by the tail buoy and tail section (coupled to the active section). More particularly, various embodiments are directed to use of a tail section with each geophysical streamer where at least a portion of the tail section is positively buoyant. The tail section thus floats closer to the surface of the water near the tail buoy, which the inventor has found reduces tugging forces caused by the tail buoy in high seas. The description turns first to an example system to orient the reader.

FIG. 1 shows an overhead view of a marine survey system 100 in accordance with at least some embodiments. In particular, FIG. 1 shows a tow or survey vessel 102 having onboard equipment, herein referred to collectively as recording system 104, such as navigation, energy source control, and data recording and processing equipment. Survey vessel 102 is configured to tow one or more geophysical streamers 106A-F through the water. While FIG. 1 illustratively shows six geophysical streamers, any number of geophysical streamers may be used.

The geophysical streamers 106A-F are coupled to towing equipment that maintains the geophysical streamers 106A-F at selected lateral positions with respect to each other and with respect to the survey vessel 102. The towing equipment may comprise two paravane tow lines 108A and 108B each coupled to the vessel 102 by way of winches 110A and 110B, respectively. The second end of paravane tow line 108A is coupled to a paravane 112, and the second end of paravane tow line 108B is coupled to paravane 114. The paravanes 112 and 114 are configured to provide a lateral force component to the various elements of the survey system when the paravanes are towed in the water. The combined lateral forces of the paravanes 112 and 114 separate the paravanes from each other until the paravanes put one or more spreader lines 116, coupled between the paravanes 112 and 114, into tension.

The geophysical streamers 106A-F are each coupled, at the ends nearest the survey vessel 102 (i.e., the "proximal" or "forward" ends) to a respective lead-in cable termination 118A-F. The lead-in cable terminations 118A-F are coupled to or associated with the spreader lines 116 so as to control the lateral positions of the geophysical streamers 106A-F with respect to each other and with respect to the vessel 102. Electrical and/or optical connections between the appropriate components in the recording system 104 and the sensors in the geophysical streamers 106A-F (e.g., sensor 128 in geophysical streamer 106A, discussed more below) may be made using inner lead-in cables 120A-F, respectively.

Each geophysical streamer 106A-F can be conceptually divided into an active section, a tail section, and a tail buoy. Thus, the geophysical streamers 106A-F comprise active sections 122A-F, tail sections 124A-F, and tail buoys 126A-F. Referring to geophysical streamer 106A as representative of all the geophysical streamers, active section 122A comprises a plurality of sensors (e.g., sensor 128) spaced along the active section 122A. Each example sensor 128 may be a seismic sensor (e.g., hydrophones, geophones), an electromagnetic sensor, or groups of seismic and electromagnetic sensors.

In order to control depth of the active sections, and in some cases to control lateral spacing between the geophysical streamers, the active section of each geophysical streamer may be associated with a plurality of streamer positioning devices periodically spaced along the active section. Again referring to geophysical streamer 106A as representative, the active section 122A of geophysical streamer 106A may be associated with streamer positioning device 130 coupled near the proximal end of the active section 122A. In many cases, the streamer positioning device 130 may provide only depth control, as the lateral spacing of the geophysical streamers near the proximal ends may be adequately controlled by the spreader cable 116. Further, representative active section 122A of geophysical streamer 106A may be associated with streamer positioning device 132, shown coupled further from the proximal ends near the distal end of the active section 122A. The streamer positioning device 132 may provide not only depth control, but also lateral positional control. While FIG. 1 shows only two of streamer positioning devices 130 and 132 associated with active section 122A of geophysical streamer 106, in practice each active section may have many streamer positioning devices periodically spaced along the entire length the active section (e.g., every 20-30 meters).

The active sections 122A-F may be referred to as "active" because during a geophysical survey the sensors (e.g., sensor 128 associated with active section 122A) may be used to gather data (e.g., seismic readings, electromagnetic readings) during the survey, and more particularly during towing of the geophysical streamers 106A-F. In practice, each active section 122A-F may be made of a plurality of active segments coupled end-to-end by way of couplers. The active segments that make up the active sections, as well as the couplers within the active sections, are not explicitly shown so as not to unduly complicate the figure. Further in practice, the lengths of the active sections 122A-F may be from a few thousands meters to 10,000 meters or more.

The geophysical streamers 106A-F are also associated with tail sections 124A-F, respectively. Again referring to geophysical streamer 106A as representative, the active section 122A defines a distal end 134. The proximal end 136 of tail section 124A couples to the distal end 134 of active section 122A, such as by way of couplers 138. Representative tail section 124A also defines a distal end 139, to which tail buoy 126A is coupled. Representative tail section 124A thus couples the distal end 134 of the active section 122A to the tail buoy 126A. The tail section 124A and tail buoy 126A may serve many functions, such as marking the end of the geophysical streamer in the water, providing support for the distal end 134 of the active section 122A, and in some cases the tail buoy 126A may have steering capabilities (which steering capabilities may help placement of the active section 122A).

In various embodiments, the tail sections 124A-F do not contain sensors, or if sensors are present in the tail sections 124A-F, the sensors are not used to collect geophysical survey data. In some cases, a tail section may be one or more segments of a geophysical streamer previously used as active segments, but where the sensors are broken, unusable, or unreliable. Thus, sometimes the tail sections are referred to as "dead sections".

Figure 2:
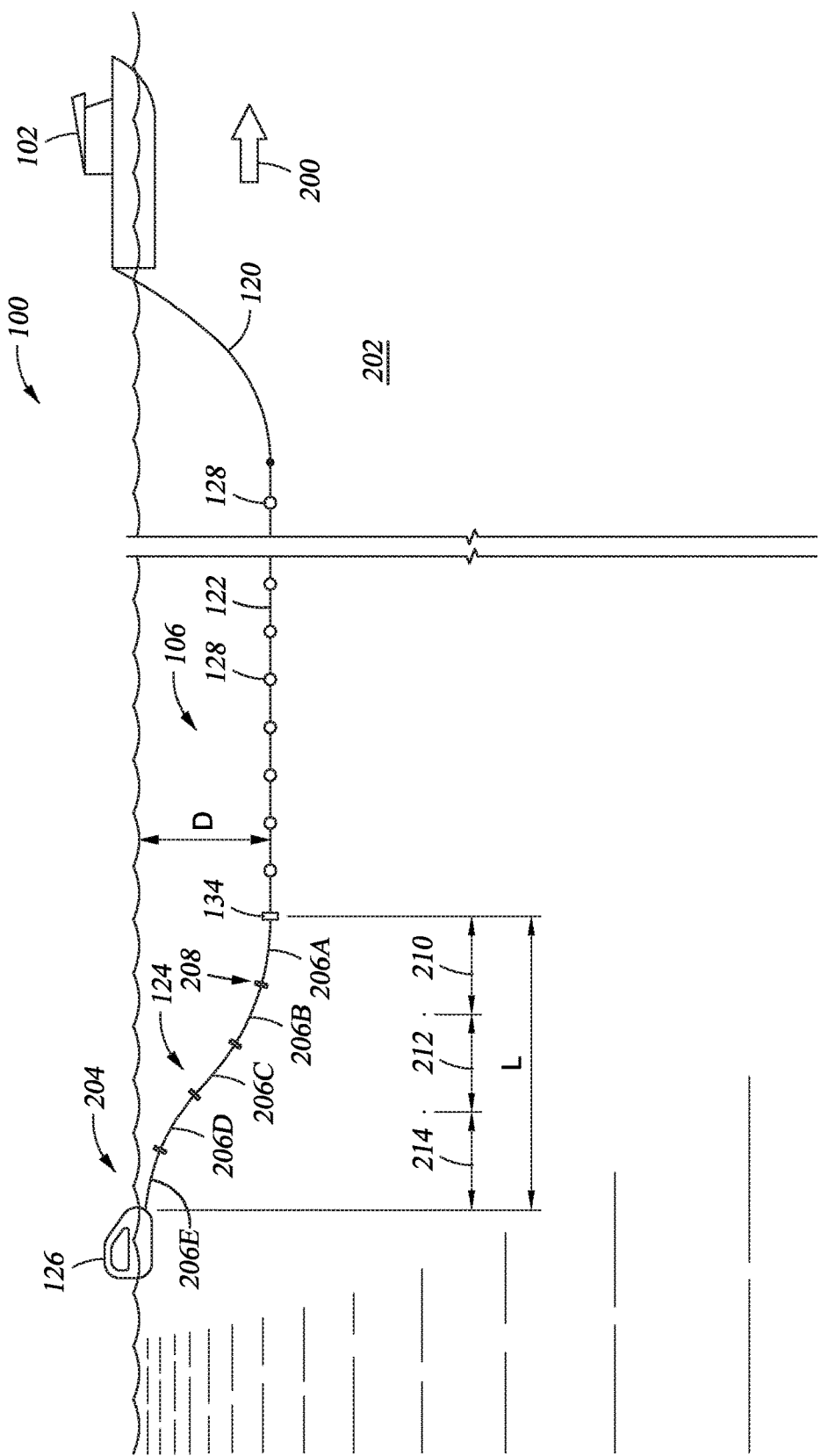
FIG. 2 shows a side elevation view of a geophysical survey in accordance with at least some embodiments.

FIG. 2 shows a side elevation view of marine survey system 100. In particular, FIG. 2 shows the survey vessel 102 towing geophysical streamer 106 along a path of travel 200 within water body 202, such as sea water. In FIG. 2, for ease of illustration, only a single geophysical streamer 106 is shown, but the geophysical streamer 106 of FIG. 2 is representative of any of the geophysical streamers 106A-F of FIG. 1. Visible in FIG. 2 is lead-in cable 120 coupled to the active section 122, with active section 122 including example sensors 128. Coupled on the distal end of the active section 122 is the tail section 124, and coupled on the distal end of the tail section 124 is tail buoy 126.

Geophysical streamer 106 may be towed at a depth D beneath the surface of the water. The towing depth D may be selected based on a variety of factors, such as the burial depth of a hydrocarbon reservoir and notch frequency in the gathered data, where the notch frequency is created by signals reflected from the surface of the water incident upon the active section 122. In some cases, the depth D may be about 20 meters, but other depths are possible, and in some cases the active section 122 may be towed such that the proximal end is shallower than the distal end.

The tail section 124 has a length L (not to scale) measured from the couplers 134 (the couplers 134 exaggerated in size for clarity) to the tail buoy 126. The length of the tail section 124 is dependent upon the tow depth D of the active section 122. For shallow tow depths, the length of the tail section 124 will be shorter as less tail section is needed to support the distal end of the active section 122 at the desired depth. Likewise, for deep tow depths the tail section will be longer to support the distal end of the active section 122 at the desired depth. For a 20 meter tow depth D, the tail section 124 may be 375 meters in length. In practice, the tail section 124 couples on its distal end 204 to a swivel device that enables the tail section 124 to twist about its long axis without imparting rotational torque to the tail buoy 126, but the swivel is not shown so as not to unduly complicate the figure. Moreover, in some cases the tail section 124 may contain communicative conductors (e.g., twisted pair copper cables, fiber optic cables), discussed more below, which enable the survey vessel 102 to communicate with the tail buoy 126, in some cases by way of an acoustic transceiver integral with the swivel.

While in some cases the tail section 124 may be a continuous section, in other cases the tail section 124 may be created by coupling together individual segments. As shown in FIG. 2, the example tail section 124 is made of five segments 206A-E with couplers between each segment. Each segment may be on the order of 75 meters in length, with five segments thus spanning a total of 375 meters. For situations where the length of tail section 124 needs to be longer (e.g., deeper tow), additional 75 meter sections may be added. For example, if a 450 meter length of the tail section is desired, six 75 meter tail sections may be coupled together. For situations where the length of tail section 124 needs to be shorter (e.g., more shallow tow), fewer 75 meter sections may be added. For example, if a 300 meter length of the tail section is desired, four 75 meter tail sections may be coupled together. Couplers between each section (e.g., couplers 208) may be of the same type and construction as couplers 134, particularly in cases where the segments of the tail section are segments previously used as active segments.

Finally with respect to FIG. 2, the tail section 124 may be conceptually divided into a plurality of smaller portions for purposes of distributing buoyancy along the tail section (discussed more below). For example, the tail section 124 may be conceptually divided into a proximal portion 210, a medial portion 212, and a distal portion 214. While FIG. 2 shows the conceptual division into three portions, the tail section 124 may be conceptually divided into more than three portions (e.g., five portions, one for each segment) for reasons that will become clear after the discussion below regarding distributing of buoyancy along the tail section 124.

In accordance with various embodiments, at least a portion of the tail section 124 is configured to be positively buoyant. Stated another way, as buoyancy is dependent to some degree upon density of the surrounding water (e.g., salinity, temperature), some or all of the tail section 124 is configured to have buoyancy that is greater than the buoyancy of the active section 122. FIG. 2 also shows a layout of the tail section 124 that is enabled by the buoyancy. That is, FIG. 2 shows that the distal portion 214 of the tail section 124 floats at or near the surface.

Figure 3:
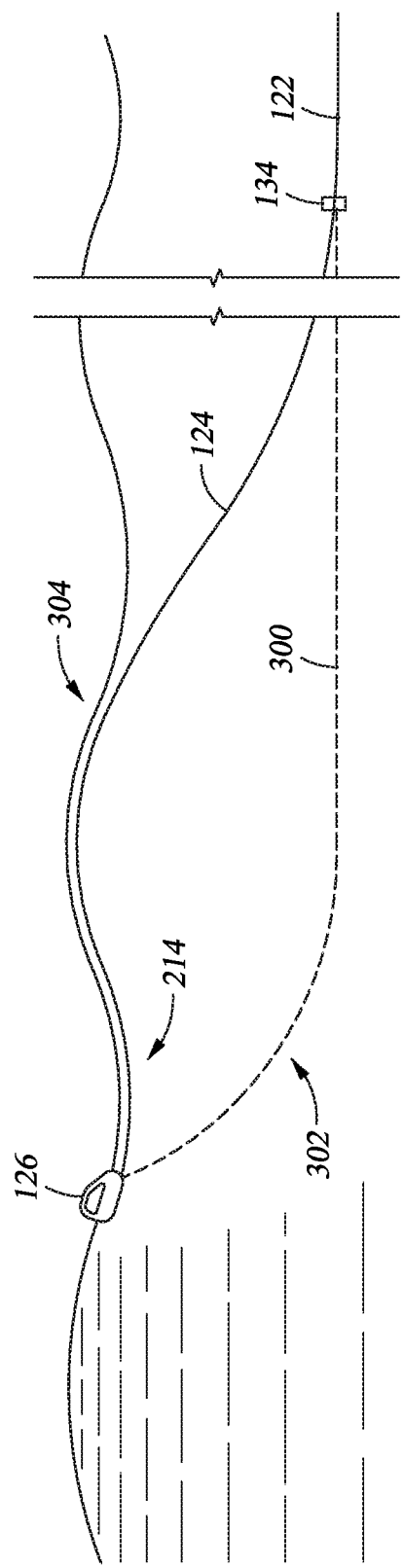
FIG. 3 shows a side elevation view of a tail section of a geophysical survey in accordance with at least some embodiments.

FIG. 3 shows a side elevation view of the tail section 124 and the tail buoy 126 in greater detail, and also shows how related-art tail sections may produce greater tugging forces in high seas. In particular, FIG. 3 shows that, because of the positive buoyancy of the tail section 124, the distal end 214 tends to float at or near the surface of the water. By contrast, the dashed line 300 shows a tail section of the related-art that is neutrally buoyant (or has the same buoyancy as the active section 122). The neutral buoyancy of the related-art tail section 300 tends to cause the tail section 300 to take a shape of a decreasing exponential function, with a substantially vertical portion 302 at the distal end near the tail buoy. As the tail buoy 126 rises on the coming wave 304, the substantially vertical portion 302 is pulled upward, which results in a tugging force applied to the active section 122. By contrast, with the positively buoyant portions of tail section 124 of the various embodiments the distal portion 214 floats at or near the surface, which reduces the tugging force applied to the active section 122 relative to the related-art tail section 300.

Using OrcaFlex™ brand software available from Orcina Ltd of the United Kingdom, a simulation was run to quantify differences in tugging force applied to the active section 122 in five meter waves for an active section 122 towed at a depth of 20 meters. In particular, in the simulation the active section had a diameter of 62 millimeters (mm), and a mass of 3.095 kilograms per meter (kg/m) (i.e., neutrally buoyant in sea water). For the positively buoyant tail section, the distal 150 meters of the tail section in the simulation was assigned diameter of 70 mm, a mass of 3.3 kg/m (resulting in 0.64 kg/m of spare buoyancy, and in this case 97 kg of spare buoyancy), a normal drag coefficient of 1.4, and an axial drag coefficient of 0.003. For the related-art tail section, the tail section was assigned a diameter of 62 millimeters and a mass of 3.095 kg/m (same as the active section). The simulation showed that, for the five meter seas, the tugging force (i.e., the axial force applied to the active section 122) was 2000 Newtons (N) for the related-art tail section 300, while the tail section 124 reduced the tugging force to 1000 N. Reduced tugging force results in lower streamer-induced noise in sensors such as hydrophones, geophones, and accelerometers. Lower noise results in higher quality and thus more valuable data. The specification now turns to the physical structure of example tail sections.

Figure 4:
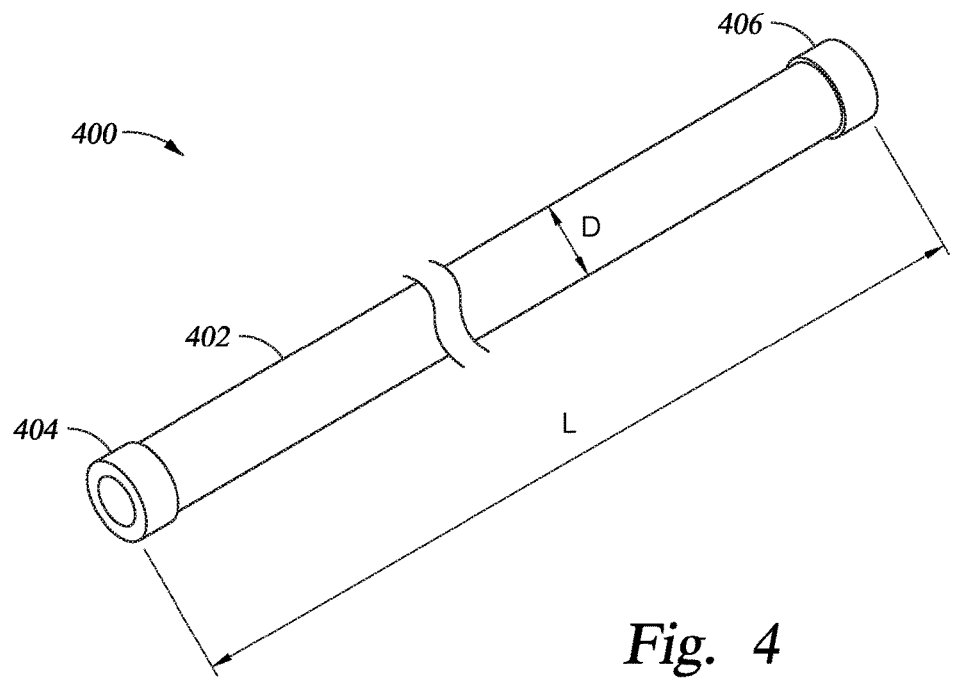
FIG. 4 shows a perspective view of a segment of a tail section in accordance with at least some embodiments.

FIG. 4 shows a perspective view of segment 400 of a tail section in accordance with example embodiments. In particular, the segment 400 has a cylindrical outer jacket 402 constructed of compliant material, such as rubber or flexible plastic. The outer jacket 402 defines an outside diameter D, which may range from about 40 mm to about 90 mm depending on the amount of buoyancy desired. Above a diameter of about 90 mm, the additional drag may obviate the benefit gained by the additional buoyancy. The segment 400 defines a length L, which may be about 75 meters, but longer and shorter segments are contemplated. The example segment 400 also defines two coupler portions 404 and 406. The coupler portions may be made of metallic material (e.g., titanium, aluminum), and the coupler portions are configured to couple to corresponding coupler portions of adjacent segments 400 (or, if the segment is the most proximal segment, the coupler at the distal end of the active section). The coupler portions 404 and 406 carry the axial towing force by way of internal strength members (discussed more below). The outer jacket 402 carries little or no towing force, and in fact may be in slight compression between the coupler portions 404 and 406. In accordance with example embodiments, the segment 400 may be at least neutrally buoyant, and may be constructed to be positively buoyant. It is noted that, if considered over small unit lengths (e.g., a centimeter in axial length) portions of the segment might be negatively buoyant (e.g., at the coupler portions 404 or 406); however, buoyancy of the overall segment 400 will be at least neutrally buoyant, and thus analyzing buoyancy over small unit lengths shall not obviate the buoyancy status of a segment (or an entire tail section).

Figure 5:
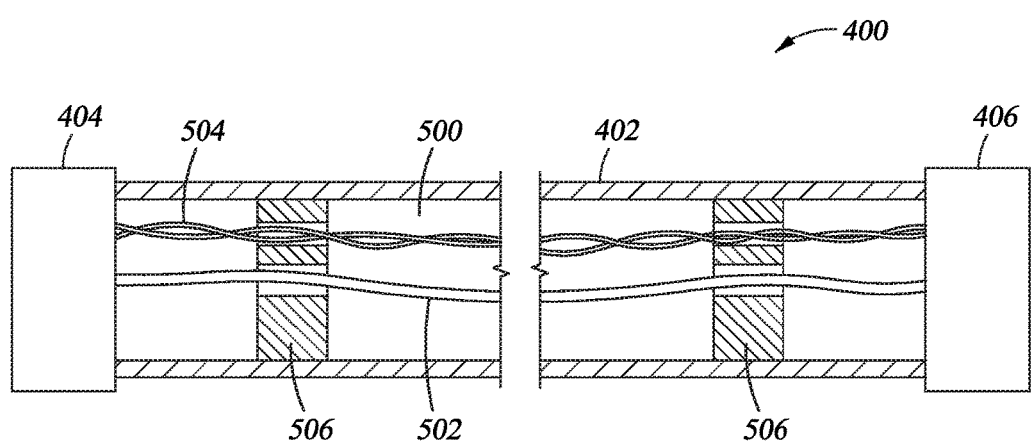
FIG. 5 shows a cross-sectional elevation view of a segment of a tail section in accordance with at least some embodiments.

FIG. 5 shows a cross-sectional view of segment 400. In particular, FIG. 5 shows the outer jacket 402 defining an interior volume 500. At the ends of the outer jacket 402 reside the coupler portions 404 and 406. The specific mechanical arrangement of the coupler portions 404 and 406 are not shown so as not unduly complicate the figure. At least one strength member 502 couples directly to coupler portion 404 on one end, and directly to coupler portion 406 on the other end. The towing force carried by the segment 400 is carried in significant part (if not all) by the strength member 502 (e.g., nylon rope). The example segment 400 further comprises communicative conductors 504 which couple to appropriate connectors (not specifically shown) in the coupler portions 404 and 406 so that communicative messages may cross from segment-to-segment. The communicative conductors may be any suitable conductors (e.g., twisted pair copper, optical fibers). The segment 400 may also comprise spacers 506 disposed within the internal volume 500, which spacers 506 may act to provide internal support for the outer jacket 402, as well as position the various other components within the segment 400.

As noted, the outer jacket 402 defines the interior volume 500. Portions of the interior volume not occupied by other components (e.g., the strength member(s), the spacers) are filled with a buoyancy fill material such that the buoyancy of the segment is set at construction. For example, the interior volume 502 may be filled with kerosene or other light oil to achieve desired buoyancy in use. In other cases, the interior volume 502 may be filled with closed cell foam, which would provide greater buoyancy than the kerosene or oil filled versions. Other fill materials, including gel materials, are possible. Thus, the buoyancy of a segment may be designed and implemented by selecting the outside diameter D (FIG. 4) of the outer jacket 402, which provides an interior volume into which the fill material is added to achieve desired buoyancy during use in the marine environment. While FIGS. 4 and 5 do not show sensors in the segment 400, in cases where the segments of a tail section were formerly segments of an active section, sensors may be present but are not used to collect seismic and/or electromagnetic data.

Figure 6:
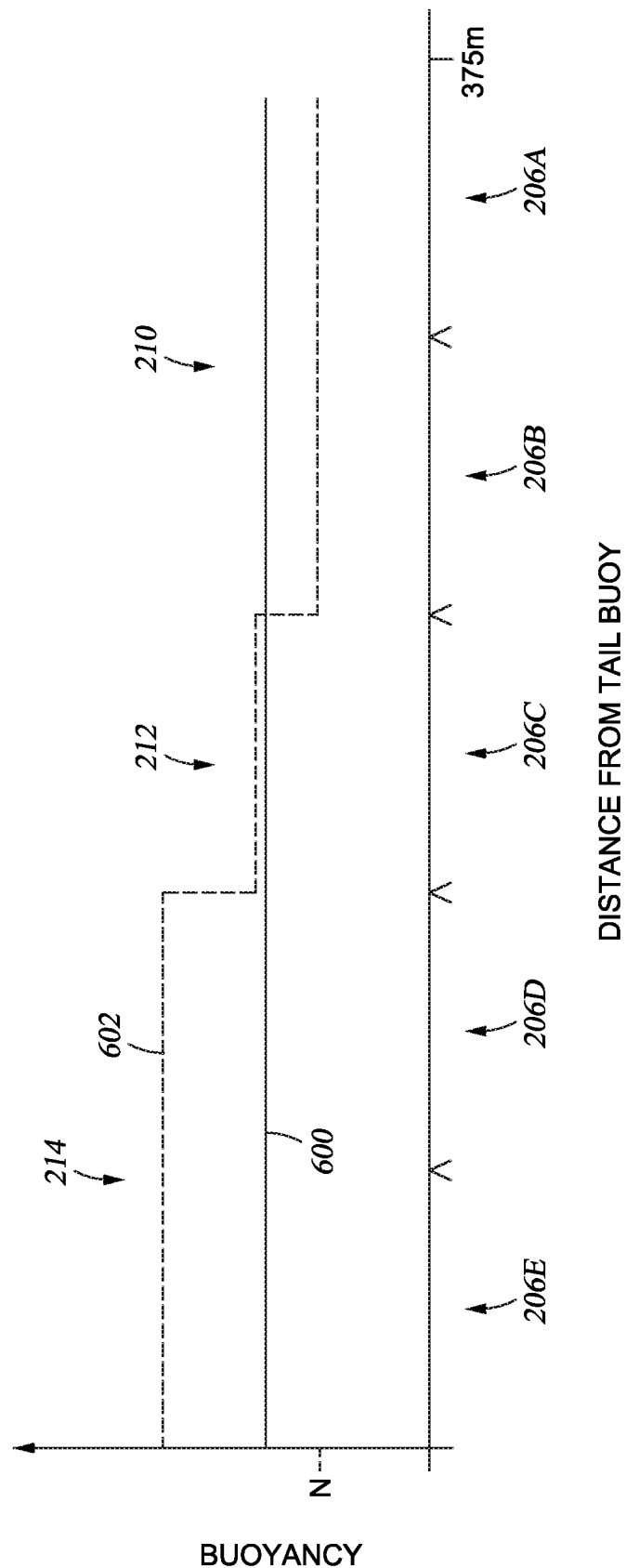
FIG. 6 shows a graph of buoyancy as function of distance in accordance with at least some embodiments.

The specification now turns to distribution of the buoyancy along the tail section 124. In accordance with example systems, the tail section 124 is more buoyant than the active section 122, and the buoyancy is evenly distributed over the entire length of the tail section 124. FIG. 6 shows a graph of buoyancy (vertical axis) as a function of distance from the tail buoy (zero on the left is the location of the tail buoy) over an example 375 meter length. In the graph, neutral buoyancy is shown by a 'N' on the buoyancy axis. Solid line 600 shows cases where the positive buoyancy is uniformly distributed over the example 375 meter length. Such a uniform distribution of buoyancy may be implemented, for example, by coupling together a plurality of segments having a diameter the same as the diameter of the active section, but with buoyancy fill material of lower specific gravity than buoyancy fill material used in the segments of the active section. The uniform distribution of the buoyancy may also be implemented by coupling together a plurality of segments having the same buoyancy fill material as the buoyancy fill material used in the segments of the active section, but where the segments used in the tail section are of greater diameter (e.g., active section having a diameter 62 mm, and tail section having a diameter 70 mm). Combinations of greater diameters and fill material with lower specific gravity may also be used.

Still considering the distribution of buoyancy as shown by line 600, attention is directed to FIG. 7 which shows a side elevation view of a tail section 124 in accordance with example systems. In particular, tail section 124 is shown to have a plurality of flotation devices 700 (hereafter just floats 700) uniformly spaced along the tail section 124, the spacing shown as S1 in the figure. The floats may be any suitable device for providing additional buoyancy to the tail section, such as closed cell foam encapsulated in a rubber or compliant plastic, and coupled to the outer jacket of the tail section. In some cases, the floats 700 define a hydrodynamic shape (e.g., torpedo shape) and an aperture along the central axis such that the floats can be telescoped over and coupled to the outer jacket of the segments of the tail sections 124 (as shown), but in other cases the floats may be coupled to the outer jacket of the segments of the tail section in any suitable form.

In the example of FIG. 7, the buoyancy of the tail section 124 is uniform when considered along the entire length of the tail section 124, or even of the length of each segment. Though there will be localized areas of higher buoyancy (at the precise locations of each float 700), such does not negate that over the entire length the buoyancy is uniform. In the example system illustrated by FIG. 7, the overall length of the tail section 124 may be 375 meters, the segments of the tail section 124 (the segments not specifically delineated) may be neutrally buoyant, each float 700 may provide 10 kg of buoyancy, and the spacing S1 may be 37.5 meters. Thus, over the entire example length, the floats may provide additional buoyancy of 100 kg, or stated otherwise an additional 0.026 kg/m of additional buoyancy. Greater or fewer floats, different buoyancy for the floats, and different spacing are possible. For example, in another example the diameter of the outer jacket of the segments is selected to be smaller than the diameter of the active section, and the loss of buoyancy caused by the smaller diameter is compensated with the addition of the floats.

Returning again to FIG. 6, in accordance with other example systems, the buoyancy of the tail section may be greater at the distal end. For example, dashed line 602 graphically illustrates a distal portion 214 of the tail section having greater buoyancy than the medial portion 212, and the medial portion 212 having greater buoyancy than proximal portion 210. In the case illustrated by dashed line 602, the proximal portion 210 is shown to be substantially neutrally buoyant, and the buoyancy along the tail section is implemented within each example segment (the lengths of the segments represented by carets along the lower horizontal axis). For example, segments 206A-B may be the same diameter as the active sections (e.g., 62 mm), segment 206C may be a slightly larger diameter (e.g., 66 mm), while segments 206D-E may be slightly larger still (e.g., 70 mm), and all having the same buoyancy fill material as the active section. As yet another example, all the segments may have the same diameter, but each segment group may have different buoyancy fill material to implement the buoyancy for each segment. Further still, the buoyancy within each group of segments (e.g., 206D-E as a group, or 206A-B as a group) may be set by a combination of diameter and fill material.

Conceptually dividing the segments into the distal two segments, the proximal two segments, and single medial segment is merely illustrative. The conceptual dividing may take place with any segment grouping (e.g., distal two segments having greater buoyancy than the proximal three segments, the distal two segments having greater buoyancy that the medial two segments and the medial two segments having greater buoyancy than the proximal segment).

Still considering the distribution of buoyancy as shown by dashed line 602, attention is directed to FIG. 8 which shows a side elevation view of a tail section 124 in accordance with an another example embodiment. In particular, tail section 124 is shown to have a plurality of floats 700 spaced along the tail section 124. In order to implement the buoyancy profile of dashed line 602 of FIG. 6, the spacing S2 of the floats along the distal portion is smaller than the spacing S3 long the medial portion, and no floats are provided in the proximal portion. Thus, the example tail section 124 provides buoyancy at the distal portion greater than buoyancy at the proximal portion of the tail section 124.

In the example system illustrated by FIG. 8, the overall length of the tail section 124 may be 375 meters, the segments of the tail section 124 (the segments not specifically delineated) may be neutrally buoyant, each float 700 may provide eight kilograms of buoyancy, the spacing S2 may be 16.7 meters, and spacing S3 may be 25 meters. Thus, the floats may provide additional buoyancy of 96 kg concentrated in the last ⅗ths of the tail section 124. Greater or fewer floats, different buoyancy for the floats, different spacing, and different distribution of the buoyancy are possible. For example, in another example the diameter of the outer jacket of the segments is selected to be smaller than the diameter of the active section, and the loss of buoyancy caused by the smaller diameter is compensated with the addition of the floats.

Figure 9:
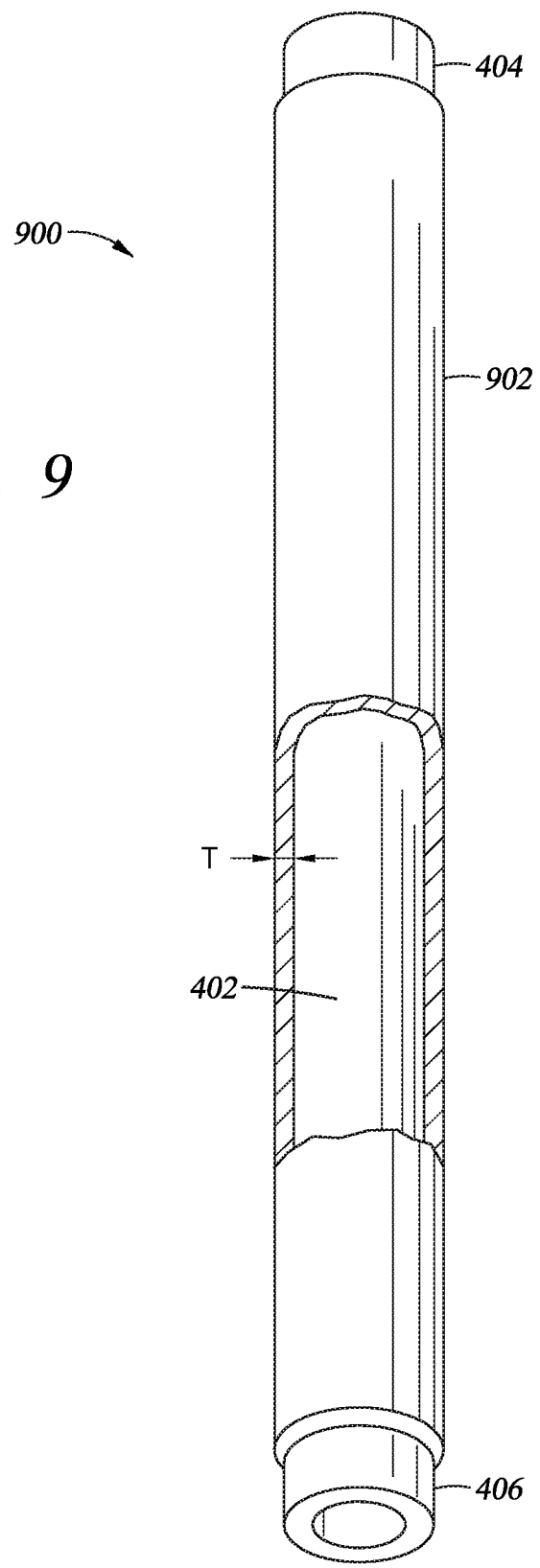
FIG. 9 shows a perspective view of a segment of a tail section in accordance with at least some embodiments.

The various embodiments discussed to this point implement the additional buoyancy of the tail section through selection of segments that have the desired buoyancy (either by way of diameter, fill material, or both), or add external floats to provide the additional buoyancy. However, in yet still other cases the buoyancy of each segment may be implemented by providing an external skin or cover that displaces additional volume and thus provides additional buoyancy to the segment (and thus the tail sections). In particular, FIG. 9 shows a perspective, partial cut-away view, of a segment 900 of a tail section in accordance with yet still further embodiments. In particular, visible in FIG. 9 are the coupler portions 404 and 406, as well as a cover 902. The cover 902 is shown in partial cut-away to show the outer jacket 402 of the segment. The cover 902 spans substantially from the coupler 404 to the coupler 406 (spans the length of the exterior portion of the outer jacket 402), and likewise overlays the entire exterior portion of the outer jacket 402. The cover 902, prior to installation, may define a sleeve structure that is telescoped over an underlying segment. In other cases cover 902, prior to installation, may define a rectangular element that is wrapped around an underlying segment and then the cover may be coupled to itself by any suitable system.

Cover 902 defines a thickness T that displaces a certain volume of water when in use. The cover 902 is made of a material with a specific gravity less than water such that the volume of water displaced by the cover 902 creates additional buoyancy for the segment 900 and thus the overall tail section into which the segment is placed. If the tail section to be created is to have uniform distribution of buoyancy (e.g., line 600 of FIG. 6), then the segments of the tail section may be selected to all have the covers of the same thickness. On the other hand, if the tail section to be created is to have greater buoyancy on distal portion (e.g., line 602 of FIG. 6), then segments that make up the distal portion may be selected to have covers with a first thickness, segments that make up the medial portion may be selected to have covers with a second thickness thinner than the first thickness, and segments that make up the proximal portion may be selected to have either no covers or covers with a third thickness smaller than both the first and second thicknesses.

The cover 902 may take any suitable form. For example, the cover material could be a composite plastic material. In other cases, the core of the cover could be polystyrene foam or a Divinycell foam, with a skin of KEVLAR® brand synthetic fiber.

Figure 10:
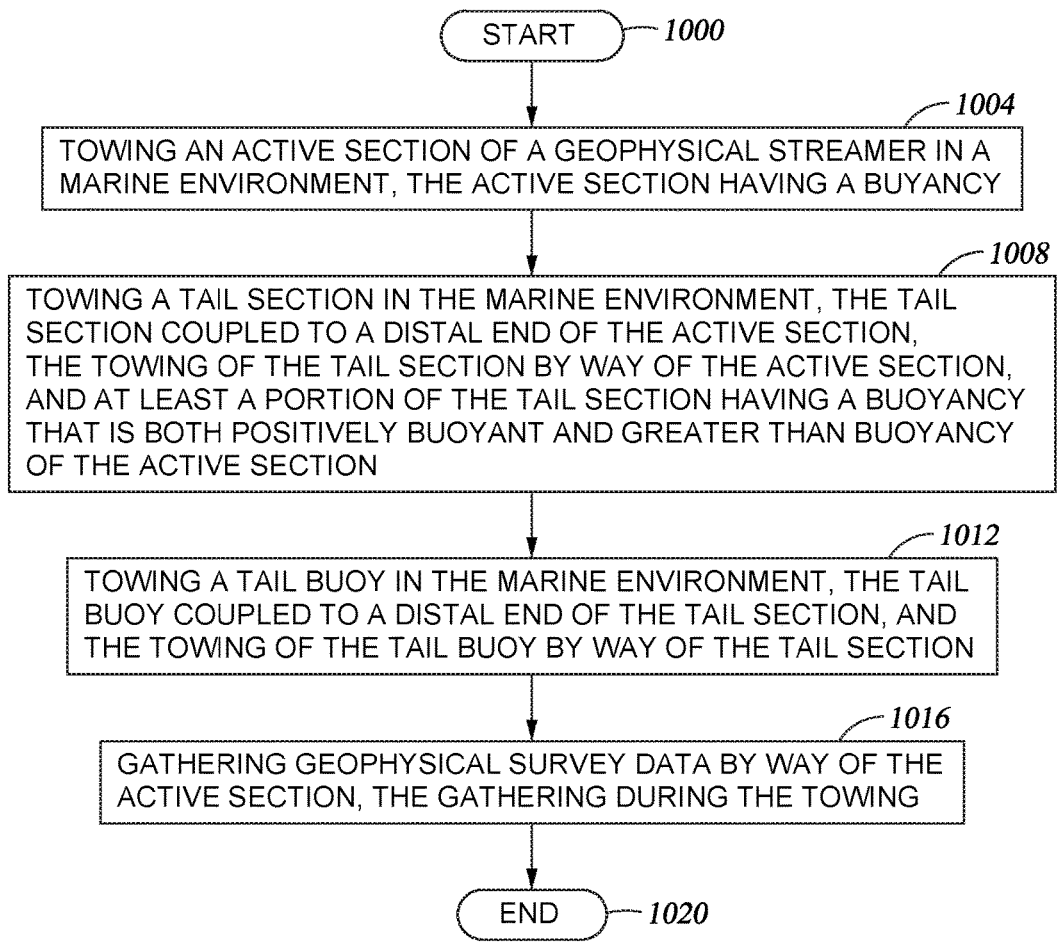
FIG. 10 shows a method in accordance with at least some embodiments.

FIG. 10 shows a method of performing a geophysical survey in a marine environment in accordance with at least some embodiments. In particular, the method starts (block 1000) and comprises: towing an active section of a geophysical streamer in a marine environment, the active section having a buoyancy (block 1004); towing a tail section in the marine environment, the tail section coupled to a distal end of the active section, the towing of the tail section by way of the active section, and at least a portion of the tail section having a buoyancy that is both positively buoyant and greater than buoyancy of the active section (block 1008); towing a tail buoy in the marine environment, the tail buoy coupled to a distal end of the tail section, and the towing of the tail buoy by way of the tail section (block 1012); and gathering geophysical survey data by way of the active section, the gathering during the towing (block 1016). Thereafter the method ends (block 1020), possibly to be immediately restarted.

Figure 11:
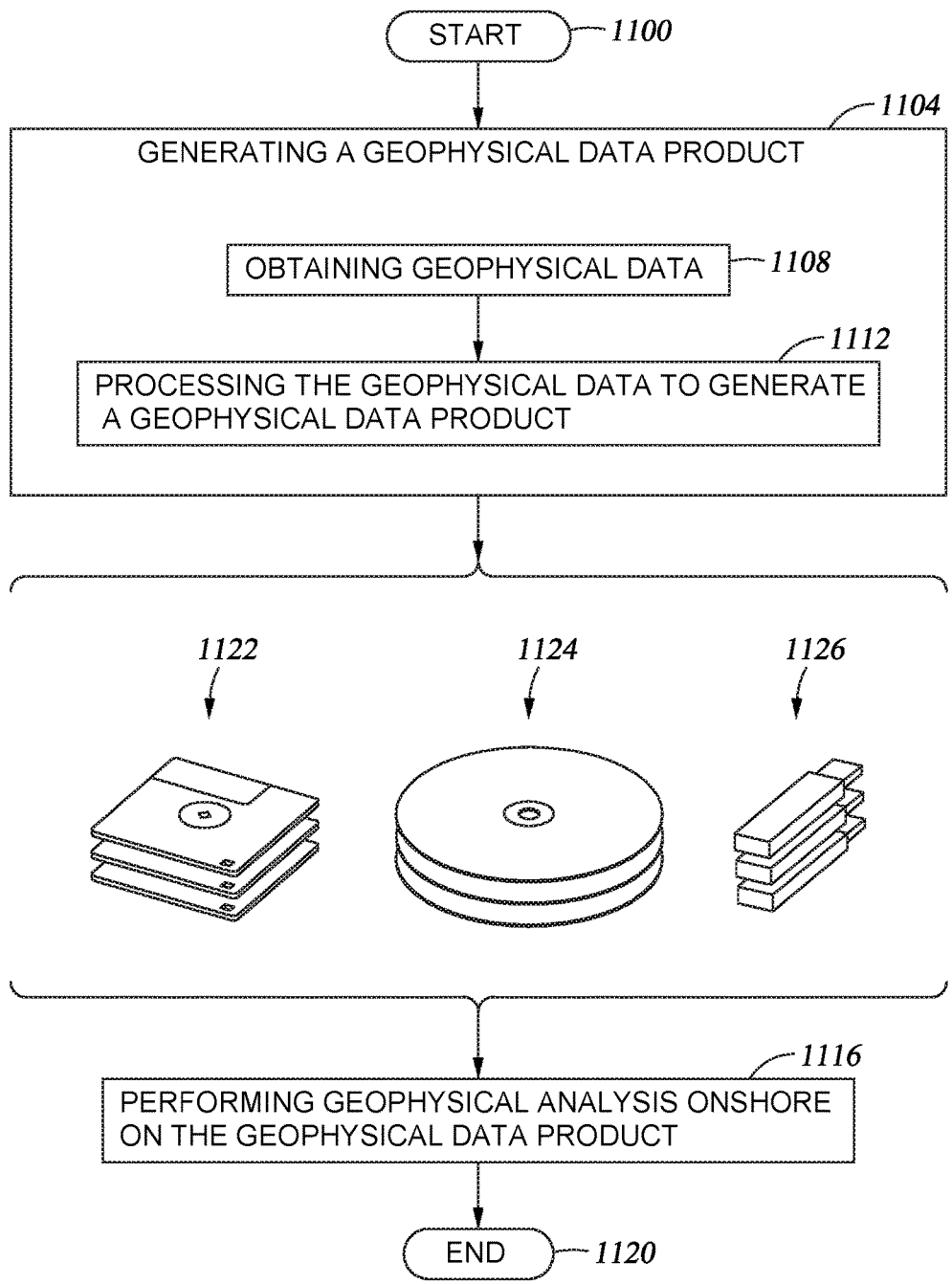
FIG. 11 shows a method in accordance with at least some embodiments.

FIG. 11 shows a method in accordance with at least some embodiments. In particular the method starts (block 1100) and comprises generating a geophysical data product (block 1104). The generating may comprise: obtaining geophysical data (block 1108); and processing the geophysical data to generate a geophysical data product (block 1112). The method may further include performing geophysical analysis onshore on the geophysical data product (block 1116). Thereafter, the method ends (block 1120). In some cases, the geophysical survey data is acquired by a method as shown in FIG. 10. Example geophysical data products may be tangible, non-volatile computer-readable mediums for importing onshore, such as: one or more "floppy" disks 1122; one or more optical disks 1124; or one or flash drives 1126.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of performing a geophysical survey in a marine environment, the method comprising:

towing an active section of a geophysical streamer in the marine environment, the active section comprising a plurality of segments coupled end-to-end by couplers on each end of the segments, and the active section having a buoyancy;

towing a tail section comprising a plurality of segments coupled end-to-end by couplers on each end of the segments of the tail section, the tail section coupled to a distal end of the active section, the towing of the tail section by way of the active section, and each segment of the plurality of segment of the tail section having a buoyancy that is both positively buoyant and greater than the buoyancy of the active section;

towing a tail buoy in the marine environment, the tail buoy coupled to a distal end of the tail section, and the towing of the tail buoy by way of the tail section; and gathering geophysical survey data only by way of the active section, the gathering during the towing.

2. The method of claim 1 wherein towing the tail section further comprises towing the tail section with the buoyancy of the tail section uniform along an entire length of the tail section.

3. The method of claim 1 wherein towing the tail section further comprises towing the tail section with a plurality of floats coupled to an exterior surface of the tail section, the floats uniformly spaced along the exterior surface.

4. The method of claim 1 wherein towing the tail section further comprises towing the tail section having an outer jacket with a diameter greater than a diameter of an outer jacket of the active section.

5. The method of claim 4 wherein towing the tail section further comprises towing the tail section with the outer jacket having a diameter greater than the diameter of the outer jacket of the active section, and the outer jacket diameter of the outer jacket of the tail section less than 90 millimeters.

6. The method of claim 1:
wherein towing the active section further comprises towing the active section having a mass per unit length that is uniform over an entire length of the active section; and
wherein towing the tail section further comprises towing the tail section having a mass per unit length that is uniform over an entire length of the tail section.

7. The method of claim 1:
wherein towing the active section further comprises towing the active section having a mass per unit length that is constant over an entire length of the active section; and
wherein towing the tail section further comprises towing the tail section having a mass per unit length that is constant over an entire length of the tail section.

8. A system comprising:
a geophysical streamer configured to couple to a tow vessel, the geophysical streamer comprising:
an active section that defines a proximal end, a distal end, and a plurality of segments coupled end-to-end by couplers on each end of the segments;
a tail section coupled to the distal end of the active section, the tail section comprising a plurality of segments coupled end-to-end by couplers on each end of the segments of the tail section;
a tail buoy coupled to the tail section opposite the active section; and
each segment of the plurality of segment of the tail section is both positively buoyant and has a buoyancy that is greater than a buoyancy of the active section.

9. The system of claim 8 further comprising the tow vessel, and the geophysical streamer coupled to the tow vessel.

10. The system of claim 9 further comprising a plurality of floats spaced along and coupled to an exterior surface of the tail section.

11. The system of claim 8 wherein the tail section further comprises an outer jacket with a diameter greater than a diameter of an outer jacket of the active section.

12. The system of claim 11 wherein the diameter of the outer jacket of the tail section is greater than the diameter of the outer jacket of the active section, and the diameter of the outer jacket of the tail section less than 90 millimeters.

13. The system of claim 8:
wherein the active section has a mass per unit length that is uniform over an entire length of the active section; and
wherein the tail section has a mass per unit length that is uniform over an entire length of the tail section.

14. The system of claim 8:
wherein the active section has a mass per unit length that is constant over an entire length of the active section; and
wherein the tail section has a mass per unit length that is constant over an entire length of the tail section.

* * * * *